United States Patent Office 2,875,133
Patented Feb. 24, 1959

2,875,133

PREPARATION OF 21-HYDROXY STEROIDS

Eugene L. Dulaney, Saskatoon, Saskatchewan, Canada, and William J. McAleer, Roselle, N. J., assignors to Merck & Co., Inc., Rahway, N. J., a corporation of New Jersey No Drawing. Application December 27, 1955
Serial No. 555,240

9 Claims. (Cl. 195—51)

This invention relates to processes for introducing oxygen substituents into a steroid molecule and particularly to processes for preparing hydroxy steroids by subjecting desoxy steroids to the action of any oxygenating strain of microorganisms or their oxygenating enzymes.

The discovery of the remarkable therapeutic properties of cortisone, hydrocortisone and similar related compounds has stimulated wide interest in finding simpler and more economical methods of preparing such compounds. In the synthesis of these compounds, it is necessary to introduce a 21-hydroxy substituent. Although various methods have been developed for the synthesis of 21-hydroxy steroids, such processes are not entirely satisfactory and other methods for the commercial preparation of 21-hydroxy steroids in high yields have been sought.

Methods for effecting the oxygenation of steroids by the action of microorganisms are known in the art. For example, various actinomycetes are known to introduce oxygen into a number of positions of the steroid molecule. Similarly, various species of genera included in the order Mucorales also introduce oxygen in various positions of the steroid ring structure. Recently a number of microorganisms have been reported which introduce a hydroxy group at the 21-position. One such disclosure appeared in Helv. Chim. Acta., 37, 1548 (1954). These microorganisms, however, generally do not present a commercially feasible method because of low yields, production of a complexity of other polyoxygenated steroids and degradation of the starting material.

A primary object of this invention is to produce oxygenated steroids by fermentation processes. A related object is to produce 21-hydroxy steroids by fermentation processes in high yields and without the formation of undesirable polyoxygenated steroids. Other objects and the advantages of this invention will appear hereinafter.

In accordance with the present invention the oxygenation of steroids is conveniently effected by subjecting steroids to the action of an oxygenating strain of fungi of the species Coniothyrium sp. (NRRL 2476) or to oxygenating enzymes produced by these microorganisms. The practice of this invention is particularly suitable for converting 21-desoxy pregnenes, pregnanes or allopregnanes to the corresponding 21-hydroxy compound in high yields without formation of undesirable polyoxygenated side products. Thus, this method provides a valuable means for introducing a 21-hydroxy substituent and thereby preparing hormones such as cortisone and other products suitable as intermediates for the production of compounds related thereto such as hydrocortisone.

The processes of this invention are particularly valuable since the use of fungi of the species Coniothyrium sp. (NRRL 2476) makes possible the introduction, by fermentation procedures, of a 21-hydroxy group. Thus, this invention provides expedient fermentation procedures for the introduction of such a group that was heretofore only commercially possible by involved organic synthesis necessitating a number of separate steps. Another feature of this process is that the action of these microorganisms will introduce oxygen selectively at the 21-position. This is important since it results in the obtainment of much better yields of the desired product and makes possible the use of simpler methods for effecting its recovery. Another important characteristic of these processes is the ability of the organism to grow on and oxidize sterols in a great variety of culture media. Further, the oxygenating strain, Coniothyrium sp. is very stable and can be lyophilized and stored without affecting its oxygenating characteristics.

The oxygenating strains of the fungi of the species Coniothyrium sp. employed in the process of this invention are of the class Fungi Imperfecti of the order Sphaeropsidales (Phomales), the family Sphaeroidaceae and the genus Coniothyrium.

This microorganism can be obtained from the Northern Regional Research Laboratories, Peoria, Illinois. Alternately it can be obtained from natural sources such as from soil using techniques known to microbiologists.

In carrying out the process of this invention the steroid to be oxygenated is subjected to the action of an oxygenating enzyme produced by growing an oxygenating strain of fungi of the species Coniothyrium sp. This is conveniently accomplished by growing the microorganism under aerobic conditions in a suitable nutrient medium in intimate contact with the steroid to be oxygenated; the culturing growth of the microorganism being continued until the desired oxygenation has occurred. Alternately the process is effected by the use of homogenized resting cells by first growing the microorganism in a suitable fermentation medium under aerobic conditions, then separating the cells from the fermentation medium and finally adding the steroid to these resting cells and continuing the aerobic conditions for sufficient time to effect the desired oxygenation. The use of resting cells has the advantage of simplifying the recovery procedure.

The steroid can be added to the nutrient medium as a suspension in a suitable solvent such as water, as a solution in a solvent such as acetone, propylene glycol, dimethylformamide or dimethylacetamide, or in a finely divided form such as a solid micronized powder. In general, it is desirable that the steroid be present in very finely divided form in order to permit maximum contact with the oxygenating culture medium and insure completion of the reaction. All of the steroid may be added at one time or the addition may be continuous or intermittent over a period of time.

The processes of the present invention can be effected in both stationary and submerged cultures of Coniothyrium sp. growing under aerobic conditions, although for practical purposes it is most conveniently carried out by growing the microorganism under submerged conditions in a suitable aqueous fermentation medium containing the steroid. The amount of the steroid which can be conveniently oxygenated by this method will depend in part upon the particular medium employed.

Aqueous nutrient mediums suitable for the growing of oxygenating strains of Coniothyrium sp. must contain sources of assimilable carbon and nitrogen as well as minor amounts of inorganic salts. Any of the usual sources of assimilable carbon such as dextrose, glucose, inverted molasses, and the like, employed in fermentation mediums can be used in carrying out the process of our invention. Similarly, complex sources of nitrogen usually employed in commercial fermentation process such as lactalbumin digest ("Edamine") and corn steep liquor, or inorganic sources of nitrogen such as dibasic ammonium phosphate, ammonium nitrate, and the like, are satisfactory for use in the fermentation mediums. Minor amounts of other substances such as nicotinamide or inorganic salts such as suitable soluble salts of magnesium, zinc, potassium, sodium, phosphorus and iron are usually available in complex sources of carbon and nitrogen or may be conveniently added to the fermentation medium in minor amounts to promote maximum growth of the oxygenating microorganism.

The following are examples of suitable aqueous nutrient mediums which can be used in the process of oxygenating steroids:

Medium No. 1:                                                    Grams
   Commercial dextrose ("Cerelose")_____ 50.00
   Commercial lactalbumin digest ("Edamine")_ 20.00
   Corn steep liquor_____ 5.00
   Distilled water is added to give a total volume of 1 liter of nutrient medium and the pH adjusted to 6.5 with sodium hydroxide.

Medium No. 2:
   Inverted blackstrap molasses_____ 100.0
   Commercial lactalbumin digest ("Edamine")_ 20.0
   Corn steep liquor_____ 5.0
   Distilled water is added to give a total volume of 1 liter of nutrient medium and the pH adjusted to 6.5 with sodium hydroxide.

Medium No. 3:
   Inverted blackstrap molasses_____ 100.0
   Corn steep liquor_____ 5.0
   Distilled water is added to give a total volume of 1 liter of nutrient medium and the pH adjusted to 6.5 with sodium hydroxide.

Medium No. 4:
   Inverted blackstrap molasses_____ 100.0
   Corn steep liquor_____ 20.0
   Distilled water is added to give a total volume of 1 liter of nutrient medium and the pH adjusted to 6.5 with sodium hydroxide.

Medium No. 5:
   Inverted blackstrap molasses_____ 50.0
   Corn steep liquor_____ 6.3
   Distilled water is added to give a total volume of 1 liter of nutrient medium and the pH adjusted to 6.5 with sodium hydroxide.

Medium No. 6:
   Dextrose _____ 50.0
   $(NH_4)_2HPO_4$ _____ 7.5
   $K_2HPO_4$ _____ 1.0
   $MgSO_4 \cdot 7H_2O$ _____ 0.5
   KCl _____ 0.5
   $FeSO_4 \cdot 7H_2O$ _____ 0.01
   $ZnSO_4 \cdot 7H_2O$ _____ 0.01
   Distilled water is added to give a total volume of 1 liter of nutrient medium and the pH adjusted to 6.5 with sodium hydroxide.

Medium No. 7:
   Cuban blackstrap inverted molasses_____ 50.0
   Corn steep_____ 5.0
   Distilled water is added to give a total volume of 1 liter of nutrient medium and the pH adjusted to 5.9 with sodium hydroxide.

Medium No. 8:
   Cubin blackstrap inverted molasses_____ 100.0
   Corn steep_____ 5.0
   Distilled water is added to give a total volume of 1 liter of nutrient medium and the pH adjusted to 5.8 with sodium hydroxide.

The addition of minor amounts of anti-foaming agents, although not essential, is desirable with some fermentation mediums. It has been found that the addition to certain fermentation mediums of a substituted oxazaline which is a non-volatile, amine-type, cationic surface active agent available under the trade name "Alkaterge C" is particularly effective in reducing the amount of foam, although other anti-foam agents known to be useful for this purpose can also be used.

As indicated above, the process of this invention is particularly useful in the oxygenation of 21-desoxy pregnenes, pregnanes including pregnadienes and allopregnanes to obtain the corresponding 21-hydroxy pregnene, pregnane and allopregnane. Other steroids, however, may be oxygenated thereby producing suitable intermediates in the preparation of hormones. Thus, this process is applicable in general to saturated and unsaturated cyclopentanopolyhydrophenanthrene compounds. Such cyclopentanopolyhydrophenanthrene compounds may be unsubstituted or may contain substituents such as keto, hydroxyl, acyloxy, halide, alkyl and the like at various positions of the cyclopentanopolyhydrophenanthrene nucleus. In addition, such compounds may have at the 17-position, a ketol side chain, a saturated or unsaturated hydrocarbon side chain, a carboxylic acid side chain, and the like. Examples of classes of such cyclopentanopolyhydrophenanthrene compounds that might be mentioned are pregnanes, pregnenes, allopregnanes, and derivatives thereof. Thus, representative 21-desoxysteroids such as progesterone; 4-pregnene-17α-ol-3,20-dione; 4-pregnene-17α-ol-3,20-dione; 4-pregnene-3β-ol-20-one; 5,6-dichloropregnane-3β-ol-20-one; 5,6-dichloropregnane-3,20-dione; 5,6-dichloropregnane-17α,3,20-dione; 4-pregnene-11α,17α-diol-3,20-dione; 4-pregnene-11α-ol-3,20-dione; 4-pregnene-17α-ol-3,11,20-trione; 4-pregnene-11,17α-diol-3,20-dione; 1,4-pregnadiene-11β,17α-diol-3,20-dione; pregnane-3,11,20-trione; allopregnane-3,11,20-trione; allopregnane-17α-ol-3,11,20-trione, pregnane-17α-ol-3,11,20-trione and the like, can be oxygenated at position 21 to obtain the corresponding 21-hydroxy derivatives.

For example, a 21-desoxy pregnene can be oxygenated in accordance with the following procedure:

A sterile culture medium, such as those shown above, is first inoculated by introducing a small amount of spore suspension or vegetative growth of an oxygenating strain of Coniothyrium sp. The inoculated nutrient medium is then incubated at a temperature of about 20–45° C., while being agitated in the presence of oxygen for a period of about a few hours to several days. At this point, a solution of a 21-desoxy pregnene in a solvent such as propylene glycol is added to the fermentation medium and the agitation and aeration of the nutrient medium continued for about five to thirty hours, or until the oxygenation reaction is completed.

When the oxygenation is complete, the oxygenated steroid may be recovered from the fermentation broth by extraction with a suitable water immiscible organic solvent for the oxygenated steroids. Suitable solvents for this purpose that might be mentioned are chloroform, methylene chloride, 2-methyl-5-ethyl pyridine, organic acid esters, aromatic hydrocarbons, ketones and amides, and the like. The solvent solution containing the desired oxygenated steroid can then be evaporated to yield the desired product which may be further purified by recrystallization or other procedures conventional in the art.

Alternatively, the process of this invention can be effected by contacting the oxygenating enzymes produced by the fermentation of Coniothyrium sp. with the steroid to be oxygenated. This can be accomplished by recovering the oxygenating enzymes from a fermentation broth in accordance with procedures known in the art, and intimately contacting such enzymes with a steriod in an aqueous medium.

The following examples are given for the purpose of illustration:

*Example 1*

Duplicate samples of approximately 50 ml. of a culture medium having the composition described as medium No. 6 were sterilized for twenty minutes at 120° C. in a 250 ml. flask. The medium was then inoculated with approximately 10 ml. of a vegetative growth of a culture of Coniothyrium sp. (NRRL 2476). This vegetative growth had been developed four days in the following medium:

| | |
|---|---|
| Commercial dextrose ("Cerelose") grams | 50 |
| Commercial lactalbumin digest ("Edamine") do | 20 |
| Corn steep liquor ml | 5 |
| Yeast extract grams | 2 |
| Malt extract do | 2 |
| Distilled water to make 1 liter at a pH of 6.5. | |

The mixture was agitated using a rotary shaker at an agitation speed of 220 R. P. M. for approximately 72 hours while maintaining the temperature at 28° C. At the end of the 72 hour period a sterile solution of approximately 20 mg. of progesterone in one-half ml. of dimethylformamide was added to the fermented medium and aeration and agitation continued at the same rate for approximately 48 hours and 90 hours. Following the oxidation cycle, the steroid containing fermented medium was sterilized and the batch was filtered and then extracted with ethyl acetate and the concentrated extract was spotted on paper and developed in the chloroform-formamide system according to the method of Zaffaroni et al. reported in Science III 6 (1950). A spot was obtained which had the mobility of an authentic sample of 4-pregnene-21-ol-3,20-dione, and a tetrazolium reducing product was present.

Example 2

Duplicate samples of approximately 50 ml. of a culture medium having the composition described as medium No. 6 were sterilized for twenty minutes at 120° C. in a 250 ml. flask. The medium was then inoculated with approximately 10 ml. of a vegetative growth of a culture of Coniothyrium sp. (NRRL 2476). This vegetative growth had been developed four days in the following medium:

| | |
|---|---|
| Commercial dextrose ("Cerelose") grams | 50 |
| Commercial lactalbumin digest ("Edamine") do | 20 |
| Corn steep liquor ml | 5 |
| Yeast extract grams | 2 |
| Malt extract do | 2 |
| Distilled water to make 1 liter at a pH of 6.5. | |

The mixture was agitated using a rotary shaker at an agitation speed of 220 R. P. M. for approximately 48 hours while maintaining the temperature at 28° C. At the end of the 48 hour period a sterile solution of approximately 20 mg. of progesterone in one-half ml. of dimethylformamide was added to the fermented medium and aeration and agitation continued at the same rate for approximately 48 hours and 96 hours. Following the oxidation cycle each flask was extracted with 50 ml. of ethyl acetate. All of the ethyl acetate extracts were combined and evaporated to dryness. An aliquot of the extract was spotted on Whatman No. 1 paper and chromatographed in the cyclohexane-benzene (50:50), propylene glycol-methanol (50:25) system for 16 hours. A U. V. absorbing product was detected at the same position as the 4-pregnene-21-ol-3,20-dione used as a control. This product gave a positive blue tetrazolium test and a positive test with iodine-potassium iodide reagent.

Example 3

Duplicate samples of approximately 50 ml. of a culture medium having the composition described as medium No. 6 were sterilized for twenty minutes at 120° C. in a 250 ml. flask. The medium was then inoculated with approximately 5 ml. of a vegetative growth of a culture of Coniothyrium sp. (NRRL 2476). This vegetative growth had been developed four days in the following medium:

| | |
|---|---|
| Commercial dextrose ("Cerelose") grams | 50 |
| Commercial lactalbumin digest ("Edamine") do | 20 |
| Corn steep liquor ml | 5 |
| Yeast extract grams | 2 |
| Malt extract do | 2 |
| Distilled water to make 1 liter at a pH of 6.5. | |

The mixture was agitated using a rotary shaker at an agitation speed of 220 R. P. M. for approximately 48 hours while maintaining the temperature at 28° C. At the end of the 48 hour period a sterile solution of approximately 20 mg. of progesterone in one-half ml. of dimethylformamide was added to the fermented medium and aeration and agitation continued at the same rate for approximately 12, 24 and 48 hours. The estimated yield is as follows:

| Age In Hours | Percent 4-Pregnene-3,20-Dione Recovered | Percent Transformation to 4-Pregnene-21-ol-3,20-Dione |
|---|---|---|
| 12 | 39.5–44 | 20.7–22.8 |
| 24 | 50 –55 | 18 –18.6 |
| 48 | 38.3–42 | 17.6–19.1 |

Example 4

Duplicate samples of approximately 50 ml. of a culture medium having the composition described as medium No. 6 were sterilized for twenty minutes at 120° C. in a 250 ml. flask. The medium was then inoculated with approximately 5 ml. of a vegetative growth of a culture of Coniothyrium sp. (NRRL 2476). This vegetative growth had been developed four days in the following medium:

| | |
|---|---|
| Commercial dextrose ("Cerelose") grams | 50 |
| Commercial lactalbumin digest ("Edamine") do | 20 |
| Corn steep liquor ml | 5 |
| Yeast extract grams | 2 |
| Malt extract do | 2 |
| Distilled water to make 1 liter at a pH of 6.5. | |

The mixture was agitated using a rotary shaker at an agitation speed of 220 R. P. M. for approximately 48 hours while maintaining the temperature at 28° C. At the end of the 48 hour period a sterile solution of approximately 20 mg. of 4-pergnene-11$\beta$-ol-3,20-dione in one-half ml. of dimethylformamide was added to the fermented medium and aeration and agitation continued at the same rate for approximately 12, 24 and 48 hours. The estimated yield is as follows:

| Age In Hours | Percent 4-Pregnene-11$\beta$-ol-3,20-Dione Recov. | Percent Transformation to 4-Pregnene-11$\beta$,21-Diol-3,20-Dione |
|---|---|---|
| 12 | 82 –78 | 9.7–10.9 |
| 24 | 80.5–84 | 6.3– 7.5 |
| 48 | 79 –77.5 | 15.3–16 |

Example 5

Duplicate samples of approximately 50 ml. of a culture medium having the composition described as medium No. 6 were sterilized for twenty minutes at 120° C. in a 250 ml. flask. The medium was then inoculated with approximately 5 ml. of a vegetative growth of a culture of Coniothyrium sp. (NRRL 2476). This vegetative growth had been developed four days in the following medium:

| | |
|---|---|
| Commercial dextrose ("Cerelose") grams | 50 |
| Commercial lactalbumin digest ("Edamine") do | 20 |
| Corn steep liquor ml | 5 |
| Yeast extract grams | 2 |
| Malt extract do | 2 |
| Distilled water to make 1 liter at a pH of 6.5. | |

The mixture was agitated using a rotary shaker at an agitation speed of 220 R. P. M. for approximately 48 hours while maintaining the temperature at 28° C. At the end of the 48 hour period a sterile solution of approximately 20 mg. of 4-pregnene-17$\alpha$-hydroxy-3,20-dione in one-half ml. of dimethylformamide was added to the fermented medium and aeration and agitation continued at the same rate for approximately 12, 24 and 48 hours. The estimated yield is as follows:

| Age In Hours | Percent 4-Pregnene-17-ol-3,20-Dione Recovered | Percent Conversion to 4-Pregnene-17, 21-diol-3,20-Dione |
|---|---|---|
| 12 | 72–76 | 6.7–5.1 |
| 24 | 82–82.5 | 6.3–5.9 |
| 48 | 80–82 | 8.8–8.3 |

Example 6

Duplicate samples of approximately 50 ml. of a culture medium having the composition described as medium No. 6 were sterilized for twenty minutes at 120° C. in a 250 ml. flask. The medium was then inoculated with approximately 10 ml. of a vegetative growth of a culture of Coniothyrium sp. (NRRL 2476). This vegetative growth had been developed three days in the following medium:

Commercial dextrose ("Cerelose") _____grams__ 50
Commercial lactalbumin digest ("Edamine")__do____ 20
Corn steep liquor _____ml__ 5
Yeast extract _____grams__ 2
Malt extract _____do____ 2
Distilled water to make 1 liter at a pH of 6.5.

The mixture was agitated using a rotary shaker at an agitation speed of 220 R. P. M. for approximately 72 hours while maintaining the temperature at 28° C. At the end of the 72 hour period a sterile solution of approximately 10 mg. of 4-pregnene-11β-ol-3,20-dione in one-half ml. of dimethylformamide was added to the fermented medium and aeration and agitation continued at the same rate for approximately 6, 12, 24, 48 and 72 hours. The estimated yield is as follows:

| Age In Hours | Percent Recovery of 4-Pregnene-11β-ol-3,20-Dione | Percent Transformation 4-Pregnene-11β, 21-Diol-3,20-Dione |
|---|---|---|
| 48 | 66.5 | 37.2 |
| 72 | 78.1 | 27.6 |

Example 7

Duplicate samples of approximately 50 ml. of a culture medium having the composition described as medium No. 6 were sterilized for twenty minutes at 120° C. in a 250 ml. flask. The medium was then inoculated with approximately 10 ml. of a vegetative growth of a culture of Coniothyrium sp. (NRRL 2476). This vegetative growth had been developed three days in the following medium:

Commercial dextrose ("Cerelose") _____grams__ 50
Commercial lactalbumin digest ("Edamine")__do____ 20
Corn steep liquor _____ml__ 5
Yeast extract _____grams__ 2
Malt extract _____do____ 2
Distilled water to make 1 liter at a pH of 6.5.

The mixture was agitated using a rotary shaker at an agitation speed of 220 R. P. M. for approximately 72 hours while maintaining the temperature at 28° C. At the end of the 72 hour period a sterile solution of approximately 10 mg. of 4-pregnene-11β,17α-diol-3,20-dione in one-half ml. of dimethylformamide was added to the fermented medium and aeration and agitation continued at the same rate for approximately 6, 12, 24, 48 and 72 hours. The estimated yield is as follows:

| Age In Hours | Percent Recovery of 4-Pregnene-11β,17α-Diol-3,20-Dione | Percent Transformation to 4-Pregnene-11β,17α,21-Triol-3,20-Dione |
|---|---|---|
| 6 | 78 | 8.65 |
| 12 | 74 | |
| 48 | 76 | 8.5 |
| 72 | 69.2 | 33.7 |

Any departure from the above description which conforms to the present invention is intended to be included within the scope of the claims.

What is claimed is:

1. A process for the production of 21-oxygenated steroid which comprises subjecting a 21-desoxy steroid selected from the group consisting of pregnenes, pregnanes and allopregnanes under aerobic conditions to the action of an oxygenating enzyme produced by an oxygenating strain of a microorganism of the species Coniothyrium sp. (NRRL 2476).

2. The process of claim 1, wherein the 21-desoxy steroid is 4-pregnene-3,20-dione.

3. The process of claim 1, wherein the 21-desoxy steroid is 4-pregnene-11β-ol-3,20-dione.

4. The process of claim 1, wherein the 21-desoxy steroid is 4-pregnene-11β,17α-diol-3,20-dione.

5. The process of claim 1, wherein the 21-desoxy steroid is 4-pregnene-17α-ol-3,20-dione.

6. A process which comprises growing an oxygenating strain of a microorganism of the species Coniothyrium sp. (NRRL 2476) under aerobic conditions in a nutrient medium containing assimilable sources of carbon and nitrogen in intimate contact with a 21-desoxy steroid selected from the group consisting of pregnenes, pregnanes and allopregnanes.

7. A process for the production of 21-oxygenated pregnene which comprises subjecting a 21-desoxy pregnene under aerobic conditions to the action of an oxygenating enzyme produced by an oxygenating strain of a microorganism of the species Coniothyrium sp. (NRRL 2476).

8. A process which comprises growing an oxygenating strain of a microorganism of the species Coniothyrium sp. (NRRL 2476) under aerobic conditions in a nutrient medium containing assimilable sources of carbon and nitrogen in intimate contact with a 21-desoxy steroid selected from the group consisting of pregnenes, pregnanes and allopregnanes to produce the corresponding 21-hydroxy steroid.

9. A process which comprises growing an oxygenating strain of a microorganism of the species Coniothyrium sp. (NRRL 2476) under aerobic conditions in an aqueous nutrient medium containing sources of assimilable carbon and nitrogen in intimate contact with a 21-desoxy pregnene and separatnig the 21-hydroxy pregnene from the resultant fermentation broth.

References Cited in the file of this patent

UNITED STATES PATENTS 2,602,769 Murray _____ July 8, 1952

OTHER REFERENCES

Meystre et al.: Helv. Chim. Acta, 37 (1954), pp. 1548–1549.